(12) United States Patent
Choi et al.

(10) Patent No.: US 8,238,566 B2
(45) Date of Patent: Aug. 7, 2012

(54) APPARATUS FOR PROVIDING SOUND EFFECTS ACCORDING TO AN IMAGE AND METHOD THEREOF

(75) Inventors: Seung-eok Choi, Seoul (KR);
Young-kyu Jin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1282 days.

(21) Appl. No.: 11/074,798

(22) Filed: Mar. 9, 2005

(65) Prior Publication Data
US 2005/0201565 A1   Sep. 15, 2005

(30) Foreign Application Priority Data
Mar. 15, 2004   (KR) .................. 10-2004-0017350

(51) Int. Cl.
*H03G 3/00* (2006.01)
*G06K 9/00* (2006.01)
(52) U.S. Cl. ........................................ 381/61; 382/325
(58) Field of Classification Search .................. 381/61; 700/94; 382/325
See application file for complete search history.

(56) References Cited

U.S. PATENT DOCUMENTS
5,310,962 A * 5/1994 Kimpara et al. ................ 84/600

FOREIGN PATENT DOCUMENTS
JP    02183371    *  7/1990
JP    02183371 A  *  7/1990
JP    2002-190009 A    7/2002

* cited by examiner

Primary Examiner — Devona Faulk
Assistant Examiner — George Monikang
(74) Attorney, Agent, or Firm — Sughrue Mion, PLLC

(57) ABSTRACT

An apparatus for providing sound effects according to an input image and a method thereof capable of conveying details of the input image lively and effectively by recognizing the shape of the image and outputting a sound suitable for the recognized shape of the image. The apparatus for providing the sound effects according to the image includes an image input unit for receiving an input of an image, a sound effect providing unit for recognizing the image inputted through the image input unit and providing the sound effects according to the input image, and an image output unit for outputting the image inputted through the image input unit and the sound provided from the sound effect providing unit.

15 Claims, 4 Drawing Sheets

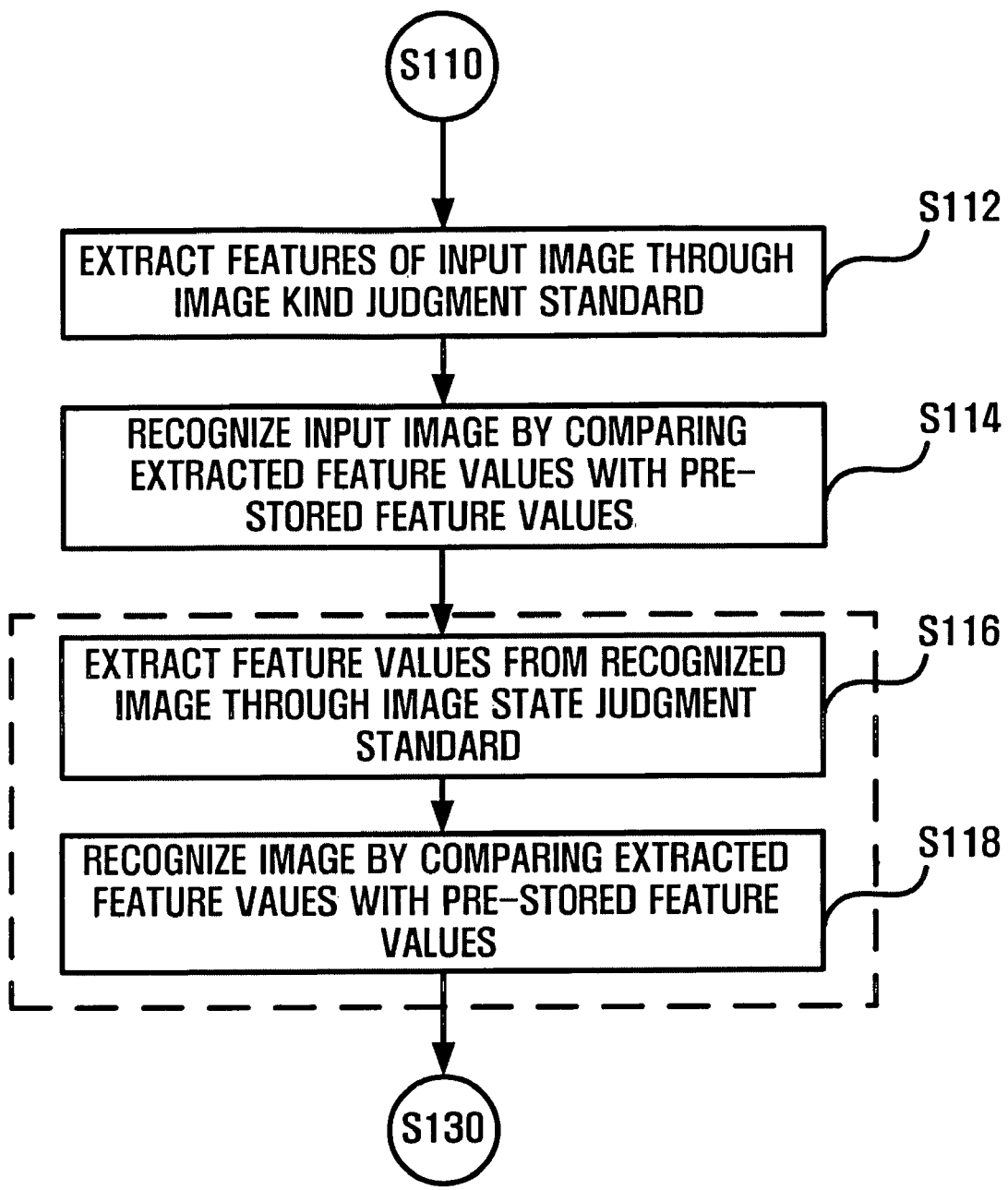

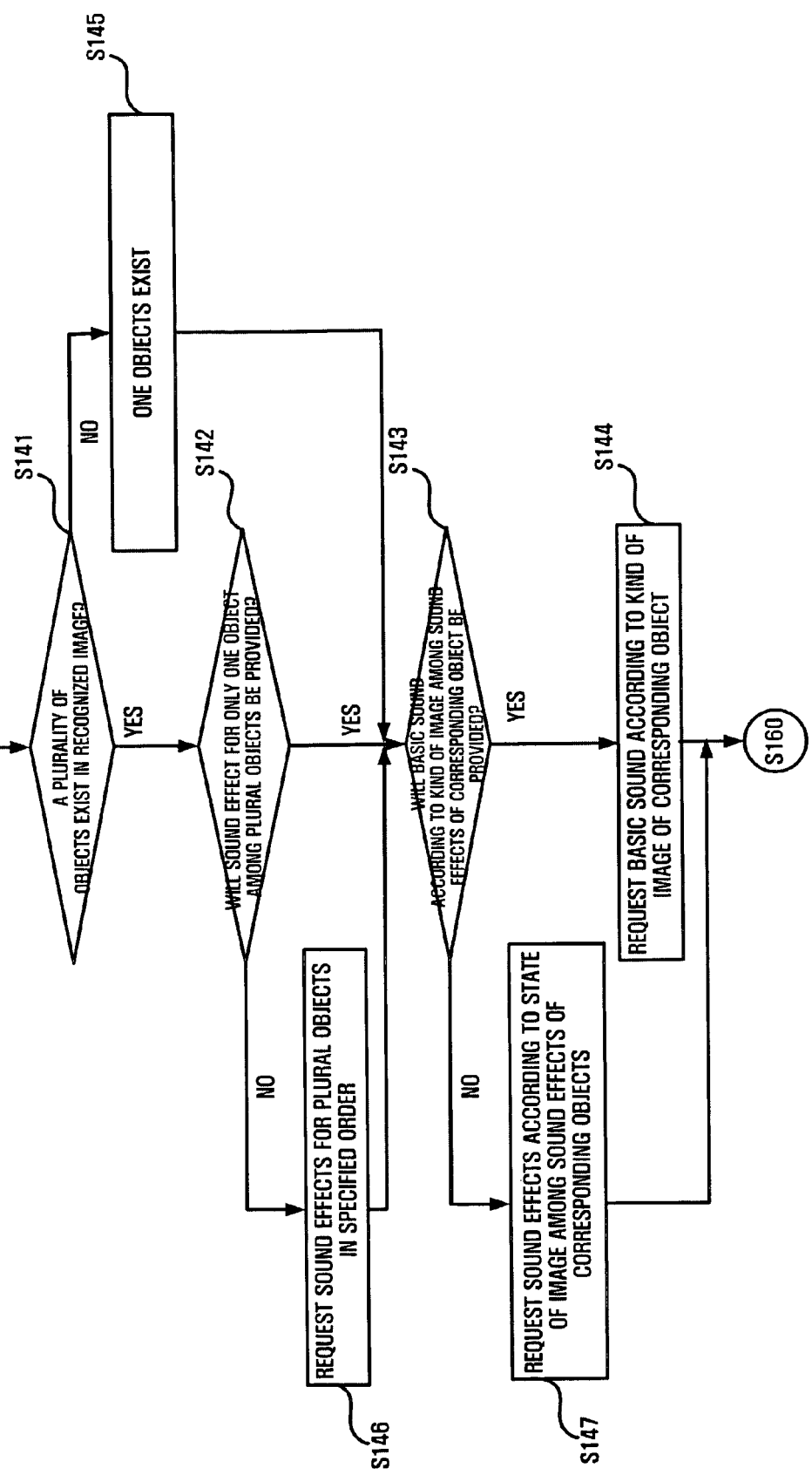

APPARATUS FOR PROVIDING SOUND EFFECTS ACCORDING TO AN IMAGE AND METHOD THEREOF

CROSS-REFERENCE TO RELATED APPLICATION

This application claims the priority of Korean Patent Application No. 10-2004-0017350 filed on Mar. 15, 2004 in the Korean Intellectual Property Office, the disclosure of which is incorporated herein in its entirety by reference.

BACKGROUND OF THE INVENTION

1. Field of the Invention

The present invention relates to an apparatus for providing sound effects according to an image and a method thereof, and more particularly to an apparatus for providing sound effects according to an input image and a method thereof which can convey details of the input image lively and effectively by recognizing the shape of the image and outputting a sound suitable for the recognized shape of the image.

2. Description of the Related Art

Recently, many CD-ROMs and programs for infant education which output specified images with corresponding sound effects have been developed.

Such CD-ROMs and programs, however, merely provide sound effects according to pre-stored images, and thus it is impossible to add new images and corresponding sound effects to the CD-ROMs once produced. Meanwhile, although programs provided on webs can add new images, they cannot match the newly added images to sounds suitable for the images, and thus cannot provide the sound effects.

Japanese Patent Laid-open No. 2002-190009 entitled "Electronic album device and computer readable recording medium recording electronic album program" discloses an apparatus for recognizing a face of a human figure corresponding to an input image (i.e., photograph) and outputting a synthesized sound using stored voice information of the corresponding human figure or a prerecorded sound.

However, since this apparatus can merely output the sound corresponding to the input image (i.e., photograph) after voice recording according to the corresponding image is performed, it has the drawback in that the voice recording should be performed whenever a new image is inputted.

SUMMARY OF THE INVENTION

Accordingly, the present invention has been made to solve the above-mentioned problems occurring in the prior art and an object of the present invention is to provide an apparatus for providing sound effects according to an image and a method thereof which can convey details of an input image lively and effectively by recognizing the image and outputting a sound suitable for the recognized image.

Additional advantages, objects and features of the invention will be set forth in part in the description which follows and in part will become apparent to those having ordinary skill in the art upon examination of the following or may be learned from practice of the invention.

In order to accomplish these objects, there is provided an apparatus for providing sound effects according to an image, which comprises an image input unit for receiving an input of an image, a sound effect providing unit for recognizing the image inputted through the image input unit and providing the sound effects according to the input image and an image output unit for outputting the image inputted through the image input unit and the sound provided from the sound effect providing unit.

The sound effect providing unit may comprise an image recognition unit for extracting features of the image inputted through the image input unit and recognizing the inputted image by classifying the inputted image through the extracted features of the image, a sound effect storage unit for storing the sound effects according to the image recognized by the image recognition unit and a feature value storage unit for storing feature values extracted from a plurality of images.

The image recognition unit may comprise at least one recognition module for recognizing the image by extracting the features of the inputted image and classifying the inputted image based on the extracted features. The recognition module may recognize the image through at least one standard of judgment.

The sound effect providing unit may judge whether the image recognized through the image recognition unit includes a plurality of objects and provide the sound effects according to the judgment result.

The sound effects stored in the sound effect storage unit may include a basic sound provided according to a first standard of judgment and sound effects which are classified and provided according to a second standard of judgment.

In another aspect of the present invention, there is provided a method for providing sound effects according to an image, which comprises the steps of recognizing an input image if the image is inputted, providing the sound effects according to the input image and outputting the input image and the provided sound effects.

The step of recognizing the input image may comprise the sub-steps of extracting features of the input image according to the first standard of judgment and recognizing the input image by comparing the extracted feature values with pre-stored feature values.

The step of recognizing the input image may further comprise the steps of extracting the features of the input image according to the second standard of judgment and recognizing the input image by comparing the extracted feature values with the pre-stored feature values.

The pre-stored feature values may be extracted from a plurality of images.

The sound effects may include a basic sound provided according to the first standard of judgment and sound effects which are classified and provided according to the second standard of judgment.

The step of providing the sound effects according to the recognized image may comprise the steps of judging whether the recognized image includes a plurality of objects; and providing the sound effects according to a judgment result.

The step of providing the sound effects according to the result of judgment may comprise the step of providing either of the basic sound provided according to the first standard of judgment and the sound effect for each state according to the second standard of judgment if it is judged that the recognized image includes one object.

The step of providing the sound effects according to the judgment result may further comprise the step of providing in order the sound effects corresponding to at least one object among the plurality of objects if it is judged that the recognized image includes the plurality of objects.

The sound effects stored in the sound effect storage unit may include a basic sound provided according to the first standard of judgment and sound effects which are classified and provided according to the second standard of judgment.

BRIEF DESCRIPTION OF THE DRAWINGS

The above and other objects, features and advantages of the present invention will be more apparent from the following detailed description taken in conjunction with the accompanying drawings, in which:

FIG. 3 is a flowchart illustrating in detail a process of extracting features through a specified standard of judgment in the method for providing sound effects according to an image according to an exemplary embodiment of the present invention; and FIG. 4 is a flowchart illustrating in detail a process of providing sound effects in the method for providing sound effects according to an image according to an exemplary embodiment of the present invention.

DETAILED DESCRIPTION OF THE PREFERRED EMBODIMENTS

Figure 1:
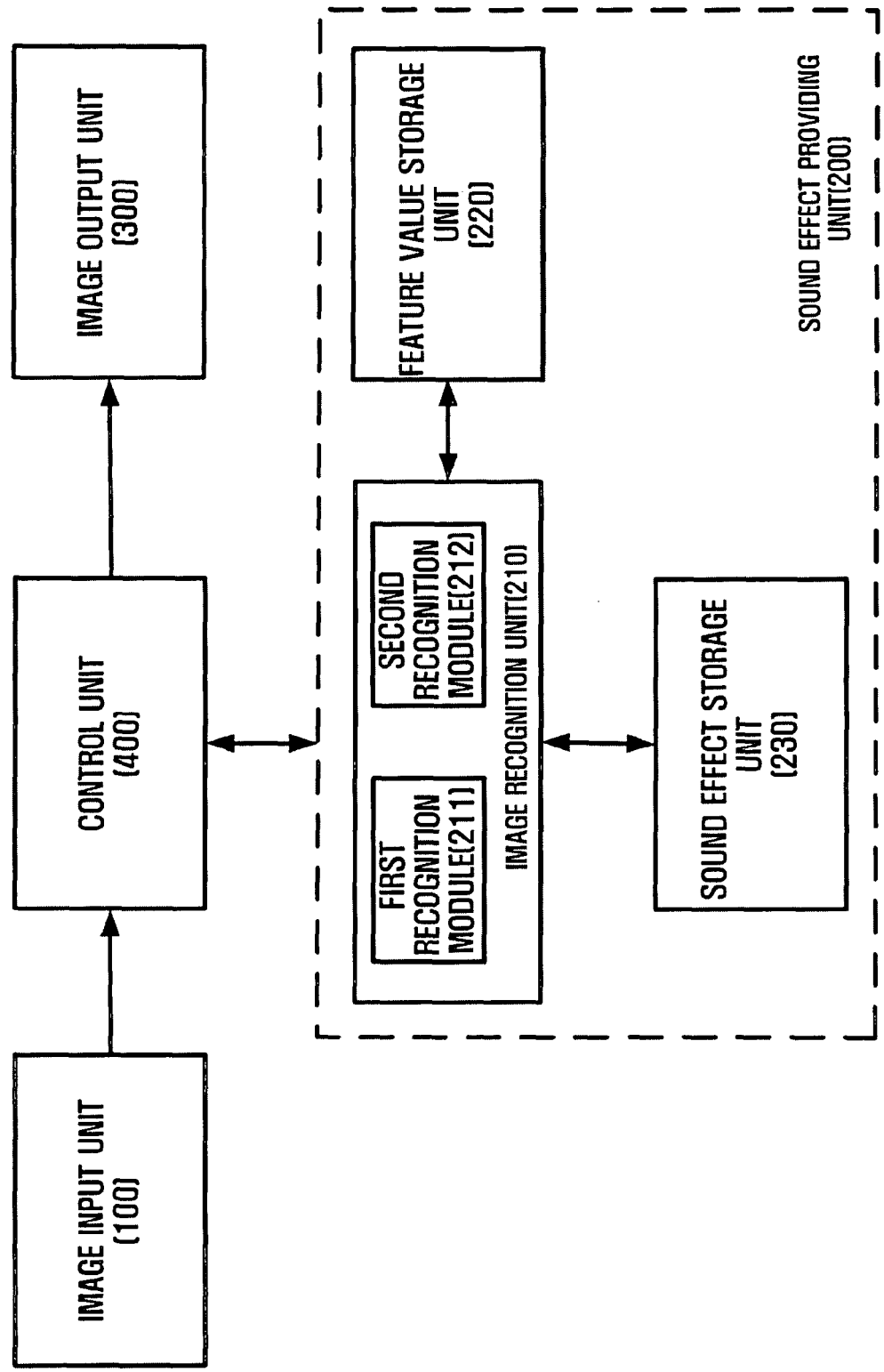
FIG. 1 is a block diagram schematically illustrating the construction of an apparatus for providing sound effects according to an image according to an exemplary embodiment of the present invention.

Hereinafter, preferred embodiments of the present invention will be described with reference to the accompanying drawings. The matters defined in the description, such as detailed construction and elements, are specific exemplary details provided to assist in a comprehensive understanding of the invention. Thus, it will be apparent that the present invention can be carried out without such limitations. In the following description of the exemplary embodiments of the present invention, the same drawing reference numerals are used for the same elements among/across various figures.

FIG. 1 is a block diagram schematically illustrating the construction of an apparatus for providing sound effects according to an image according to an exemplary embodiment of the present invention. Referring to FIG. 1, the apparatus includes an image input unit 100, a sound effect providing unit 200, an image output unit 300 and a control unit 400.

The image input unit 100 receives an image through a specified device and medium. Here, the image can be understood as a multimedia file provided from a terminal device, recording medium and web which is provided through an apparatus which can display an image and output sound such as a web, e-book or electronic album.

The sound effect providing unit 200 recognizes the image inputted through the image input unit 100 and provides sound effects according to the recognized image. The sound effect providing unit 200 includes an image recognition unit 210, a feature value storage unit 220 and a sound effect storage unit 230.

The image recognition unit 210 extracts features of the image inputted through the image input unit 100 and recognizes the inputted image by classifying the inputted image through the extracted features of the image. Specifically, the image recognition unit 210 extracts the features of the inputted image through specified standards of judgment, and classifies and recognizes the inputted image by comparing the feature values of the inputted image with pre-stored feature values.

The image recognition unit 210 includes at least one module for recognizing the image through at least one standard of judgment.

The recognition of the inputted image is performed through pattern recognition. The pattern recognition is performed in a manner that feature values of input images are extracted through a specified feature extraction algorithm and the extracted feature values are classified according to a specified rule or standard. Here, the pattern classification can be performed through a pattern algorithm, such as a neural network algorithm, a genetic algorithm, a neurofuzzy algorithm, fuzzy algorithm, etc.

Hereinafter, the image classification method through the pattern algorithm according to an embodiment of the present invention will be explained.

First, a first face area is extracted using color information. Specifically, if a specified image is inputted, the color space (i.e., color model) of the inputted image is converted from RGB into HIS (Hue, Intensity and Saturation) and then the image is divided into a chromatic area and an achromatic area. Then, a brief first feature extraction area according to color is determined in the chromatic area.

Then, a second image area is extracted using a wavelet transform. Specifically, sub-bands of a pyramid structure, which have multi-resolution of diverse sizes, are created through an image dividing process, and image information is extracted from the sub-bands.

Accordingly, through the image classification method via pattern recognition, a feature area that includes face constituent elements is extracted using color information provided by the HIS color model and edge information provided by the wavelet transform, and then the image is classified and searched through the neural network.

Here, although the image classification method through the wavelet and neural network has been explained as an example of the pattern recognition, the present invention is not limited thereto, but can perform the image recognition and classification through other methods well known to those skilled in the art.

Meanwhile, an image recognition module 211 of the image recognition unit 210 extracts features of the inputted image through a specified standard of judgment, and classifies the image based on the extracted features.

Here, the specified standard of judgment may be understood as a standard of image classification performed by extracting the features whereby the kind of the inputted image (for example, a human, animal, object, nature, etc.) can be judged or by extracting the features whereby the state of the image (for example, laughing, crying and angry states) can be judged.

Specifically, the image recognition unit 210 may judge only the kind of the inputted image or the detailed state of the image in addition to the kind of image in accordance with the standard of judgment. The standard of judgment can be set through a user's selection.

For example, if the specified standard of judgment is set so as to judge the image by extracting the features of the image whereby the kind or type of image can be judged. The kind of inputted image is judged by extracting the features of the whole shape, eyes, nose and mouth of the inputted image (i.e., sizes, angles and distances between the ear, eyes, mouth and nose). The judged image values are then compared with the pre-stored image values and then the kind or type of inputted image is judged on the basis of the comparison result.

Meanwhile, if the specified standard of judgment is set so as to judge the image by extracting the features of the image whereby the state of the image can be judged, the state of the inputted image is judged by extracting the features of the whole shape, eyes, nose and mouth of the inputted image (i.e., shapes of the mouth and eyes, wrinkles of the face, skin and build structures, etc.).

Then, the judged image values are compared with the pre-stored image values and then the state of the inputted image such as whether the image has a laughing or crying figure, age and sex of the image, etc., is judged on the basis of the comparison result.

The image recognition unit 210 includes at least one recognition module (i.e., first recognition module 211, second recognition module 212, . . . and n-th recognition module). These recognition modules can perform different recognition functions.

For example, if it is assumed that the first recognition module 211 judges the kind of image inputted through the first standard of judgment (hereinafter referred to as an "image kind judgment standard") and the second recognition module 212 judges the state of the image inputted through the second standard of judgment (hereinafter referred to as an "image state judgment standard"). The first recognition module 211 extracts the features of the whole shape, eyes, nose and mouth of the image based on the image kind judgment standard, then judges the kind of inputted image through the extracted features (i.e., the whole shape of the image, sizes, angles and distances between the ear, eyes, mouth and nose, etc.).

The second recognition module 212 extracts the features of the eyes, nose and mouth of the image based on the image state judgment standard and judges the state of the inputted image (for example, laughing figure, crying figure, sleeping figure, etc.) through the extracted features (i.e., shapes of the mouth and eyes, wrinkles of the face, skin and build structures, etc.).

Accordingly, the inputted image is finally recognized in consideration of, for example, the kind of the image judged by the first recognition module 211 and the state of the image judged by the second recognition module 212.

The feature value storage unit 220 stores feature values extracted from a plurality of images. In the feature value storage unit 220, feature values of diverse kinds of images and diverse states of images are stored.

Here, the feature value storage unit 220 stores feature values of images by kinds according to the kind or type of images (for example, human, cat, dog, tiger, horse, vehicle, motorcycle, nature, etc.) and images according to the states of the images (for example, laughing figure, crying figure, sleeping figure, etc.) and if the image refers to a human, the feature values to be stored may be classified according to the age and sex of the human.

The feature value storage unit 220 stores the feature values of the images in the form of a table, and Table 1-1 below shows features of the images by kind and state of the images.

TABLE 1-1

| Kind of Image | State of Image | | | |
|---|---|---|---|---|
| Human | Laughing | Crying | Angry | ... |
| Cat | Pleasant | | Fighting | ... |
| Dog | Pleasant | | Fighting | ... |
| Tiger | Pleasant | | Fighting | ... |
| Horse | Pleasant | | Fighting | ... |
| Vehicle | Standing | Moving | Horning | ... |
| Motorcycle | Standing | Moving | Horning | ... |
| Nature | Windy | Raining | Snowing | ... |
| ... | | ... | | |

In another embodiment of the present invention, if the image refers to a human, the features by states can be classified in more detail. For example, shadowed parts in Table 1-1 may be replaced by the contents of Table 1-2 below. For reference, in Table 1-2, if the image refers to the human, the feature values by state are classified into a first state based on the age and sex of the image and a second state based on the feelings.

TABLE 1-2

| First State | Second State | | | |
|---|---|---|---|---|
| Baby | Laughing | Crying | Angry | ... |
| Boy | Laughing | Crying | Angry | ... |
| Girl | Laughing | Crying | Angry | ... |
| Man | Laughing | Crying | Angry | ... |
| Woman | Laughing | Crying | Angry | ... |
| Aged Person | Laughing | Crying | Angry | ... |

Meanwhile, the feature value storage unit 220 stores the feature values extracted from the plurality of images, and the image recognition unit 210 can recognize the image stably and accurately based on the feature values.

Also, the feature value storage unit 220 can separately store the feature values of specified images (for example, an image of a family, image of a performer, etc.) according to a user's setting, and the stored feature values and the kinds of images can be modified and updated.

The sound effect storage unit 230 stores and provides sound effects according to the image recognized by the image recognition unit 210, i.e., sound effects most suitable for the recognized image. Here, the sound effect storage unit 230 stores basic sounds according to the kinds of images and the sound effects according to the kinds of images.

Specifically, in the case that the image recognition unit 210 recognizes only the kinds of images, the sound effect storage unit provides the basic sounds according to the kinds of images, while in the case that the image recognition unit 210 recognizes the states of images, the sound effect storage unit provides the sound effects according to the states of images. For example, if the image refers to the human, the sound effect storage unit provides the basic sound and the sound effects by states, for example, sound of laughter, cry, gossip, shout, etc.

Also, if the image refers to a dog, cat, tiger, etc., the sound effect storage unit provides the basic sound of the respective animal and the sound effects by states, for example, sound of a bark, meow, roar, etc., when the dog, cat or tiger is angry.

Also, if the image refers to a vehicle, train, motorcycle, etc., the sound effect storage unit provides the basic sound of the respective object and the sound effects by states. For example, the sound of a horn or engine of a particular vehicle, etc.

Also, if the image refers to nature, the sound effect storage unit provides the basic sound of nature and the sound effects by states, for example, sound of wind, rain, flowing water, treading on snow, etc. Here, the basic sound according to the kind of image can be determined by the user's selection.

The sound effect storage unit 230 can store the sounds corresponding to the images using Table 2-1 below.

TABLE 2-1

| Sound Effects by Kinds (Basic Sound) | | Sound Effects by States | | |
|---|---|---|---|---|
| Human | Laughing | Crying | Angry | ... |
| Cat | Pleasant | | Fighting | ... |
| Dog | Pleasant | | Fighting | ... |
| Tiger | Pleasant | | Fighting | ... |
| Horse | Pleasant | | Fighting | ... |
| Vehicle | Starting | Moving | Honking | ... |
| Motorcycle | Starting | Moving | Honking | ... |
| Nature | Windy | Raining | Treading on Snow | ... |
| ... | | ... | | |

For example, it is assumed that the control unit 400 requests the basic sound according to the kind of image. If the input image refers to a human, the basic sound of the human (for example, laughter) is provided as shown in Table 2-1, while if the input image refers to a cat, the basic sound of the cat (for example, meow of the cat) is provided as shown in Table 2-1.

Also, it is assumed that the control unit 400 requests the basic sound according to the state of image. If the input image refers to the human and the state of the image refers to a human cry, the sound effects according to the crying figure of the human are provided as shown in Table 2-1, while if the input image refers to the cat and the state of the image refers to fighting cats, the sound effects according to the fighting cats are provided as shown in Table 2-1.

In another embodiment of the present invention, if the input image refers to a human, the sound effects by states can be classified in more detail. For example, shadowed parts in Table 2-1 may be replaced by the contents of Table 2-2 below.

TABLE 2-2

| Sound Effects by First States | Sound Effects by Second States | | | |
|---|---|---|---|---|
| Baby | Laughing | Crying | Angry | ... |
| Boy | Laughing | Crying | Angry | ... |
| Girl | Laughing | Crying | Angry | ... |
| Man | Laughing | Crying | Angry | ... |
| Woman | Laughing | Crying | Angry | ... |
| Aged Person | Laughing | Crying | Angry | ... |

In this case, as shown in Table 2-2, the sound effects in consideration of the first state (for example, age and sex) and the second state (for example, feelings) can be provided. For example, if the inputted image refers to a girl, a sound of the girl's voice is provided, while if the inputted image refers to a baby, a cry of the baby is provided.

Meanwhile, the sound effect storage unit 230 judges whether the image recognized through the image recognition unit 210 includes a plurality of objects, and provides specified sound effects according to a specified algorithm.

For example, if the image recognized through the image recognition unit 210 includes an object as a result of judgment, the sound effect storage unit provides the basic sound according to the kind of image and the sound effects according to the state of the image as described above.

If the image recognized through the image recognition unit 210 includes a plurality of objects, the sound effect storage unit provides only the sound effects (i.e., the basic sound according to the kind of image and the sound effects according to the state of the image) of the specified object among the plurality of objects or provides the sound effects of the plurality of objects in a specified order or at the same time.

Diverse algorithms may be applied to the method for providing the sound effects when plural objects are recognized.

For example, if the inputted image refers to nature, either the sound of wind or the sound of rain may be provided or the sound of wind and the sound of rain may repeatedly be provided in a specified order.

Meanwhile, the sound effect storage unit 230 can store the sound effects through diverse classifications (for example, an image of a family, image of a performer, etc.) according to a user's setting. Also, the sound effects stored in the sound effect storage unit 230 can be modified and updated by the user.

The image output unit 300 outputs the image inputted through the image input unit 100 and the sound effects provided by the sound effect storage unit 230.

The control unit 400, if the inputted image is recognized, controls respective devices so as to provide the sound effects suitable for the recognized image. Specifically, if the image input unit 100 receives the image, it transfers the inputted image to the image recognition unit 210 and requests the sound effect storage unit 230 to search for the sound effects most suitable for the image recognized by the image recognition unit 210. Thereafter, the control unit outputs the inputted image and the sound effects transmitted by the sound effect storage unit 230 to the image output unit 300.

Figure 2:
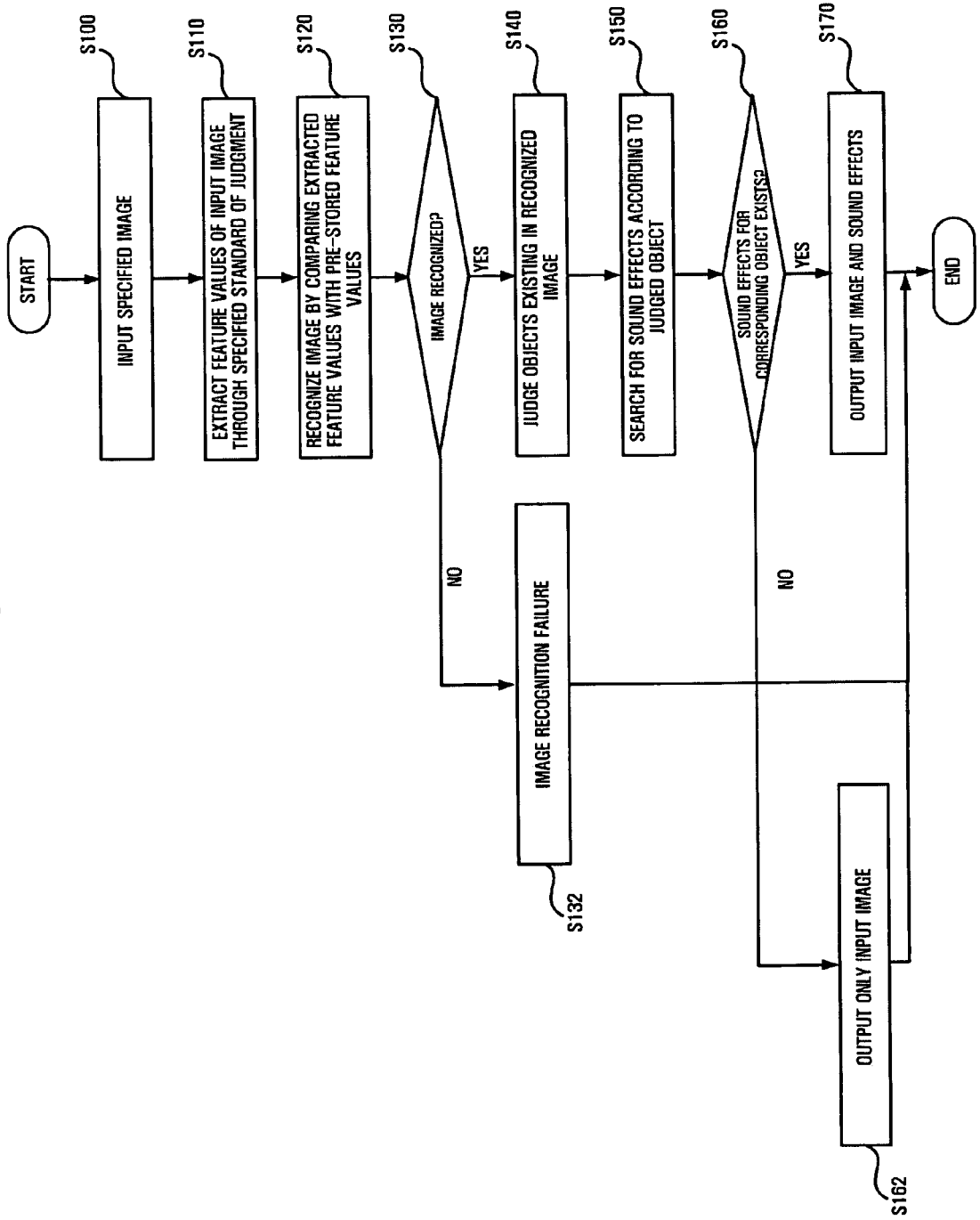
FIG. 2 is a flowchart schematically illustrating a method for providing sound effects according to an image according to an exemplary embodiment of the present invention.

FIG. 2 is a flowchart schematically illustrating a method for providing sound effects according to an image according to an exemplary embodiment of the present invention.

Referring to FIG. 2, if the specified image is inputted through the image input unit 100, the control unit 400 transmits the inputted image to the image recognition unit 120 (step S100).

Then, image recognition unit 210 extracts the features of the inputted image through a specified standard of judgment (step S110) and recognizes the inputted image by comparing the extracted feature values with the feature values pre-stored in the feature value storage unit 220 (step S120).

Here, the specified standard of judgment may be understood as a standard of image classification performed by extracting the features whereby the kind of the inputted image can be judged (i.e., an image kind judgment standard) or a standard of image classification by extracting the features whereby the state of the image can be judged (i.e., an image state judgment standard). The standard of judgment can be set through the control unit 400 or by a user's selection.

For example, if the standard of judgment is the image kind judgment standard, the image recognition unit 210 extracts the features of the whole shape, eyes, nose and mouth of the inputted image and compares the extracted feature values with pre-stored feature values.

During the feature value comparison, the kind of image is judged by classifying the inputted image based on the features for judging the image kind (for example, the whole shape of the inputted image, sizes, angles and distances between the ear, eyes, mouth and nose).

Meanwhile, if the standard of judgment is the image state judgment standard, the image recognition unit 210 extracts the features of the whole shape, eyes, nose and mouth of the inputted image and compares the extracted feature values with pre-stored feature values.

During the feature value comparison, the state of the image such as whether the image has a laughing or crying figure, age and sex of the image, etc., is judged based on the features for judging the image state, for example, the shapes of the mouth and eyes, wrinkles of the face, skin and build structures, etc.

Meanwhile, the extraction of the features of the inputted image may be performed using a plurality of image recognition modules provided in the image recognition unit 210, and the respective image recognition modules may extract the features through different standards of judgment. The feature extraction and image recognition processes will be explained later with reference to FIG. 3.

Then, the control unit 400 judges whether the image recognition unit 210 has recognized the image (step S130), and if it is judged that the image is recognized, the control unit judges the number of objects that exist in the recognized image (step S140).

If the number of objects existing in the image is one as a result of judgment, the control unit 400 searches for the sound effects (i.e., the basic sound according to the kind of the image and the sound effects according to the state of the image) for the corresponding object from the sound effect storage unit 230 (step S150).

Here, the basic sound according to the kind of image may be understood as the representative sound effects according to the kind of image, for example, a human's laughter, cat's meow, etc., and the sound effects according to the state of the image may be understood as detailed sound effects according to the kind and state of the image, for example, a baby's cry, grandfather's laughter, the sound produced when cats fight, etc.

If the number of objects existing in the image is plural as a result of judgment (step S140), the control unit 400 determines whether to provide the sound effects for a specified object among the plurality of objects or to provide the sound effects for the plurality of objects in accordance with a specified algorithm, and searches for the corresponding sound effects from the sound effect storage unit 230 (step S150).

Here, according to the selected algorithm, the sound effects for the specified object among the plurality of objects may be provided. Also, the sound effects for the plurality of objects may be provided in a specified order or at the same time. The process of providing the sound effects according to the number of objects existing in the image will be explained later with reference to FIG. 4.

Then, the control unit 400 judges whether the sound effects for the corresponding object exist by searching the sound effects stored in the sound effect storage unit 230 and if it is judged that the sound effects for the corresponding object exist in the sound effect storage unit 230, the control unit 400 provides a single or a plurality of sound effects for the corresponding object (step S160).

Then, the control unit 400 outputs the inputted image and the sound effects stored in the sound effect storage unit 230 to the image output unit 300 (step S170).

Meanwhile, if the image recognition unit 210 fails to recognize the inputted image (step S132), the control unit 400 terminates the image recognition process. If it is judged that the sound effects suitable for the inputted image do not exist in the sound effect storage unit 230 at step S160, the control unit 400 outputs only the inputted image (step S162).

FIG. 3 is a flowchart illustrating in detail a process of extracting features through a specified standard of judgment in the method for providing sound effects according to an image according to an exemplary embodiment of the present invention.

First, the image recognition module 211 of the image recognition unit 210 extracts the features of the image inputted through the image input unit 100. Here, the image recognition module 211 extracts the features whereby the kind of inputted image can be judged based on the image kind judgment standard (step S112).

Next, the image recognition module judges the kind of inputted image by comparing the feature values extracted through the image kind judgment standard with the pre-stored feature values (step S114).

Specifically, the image recognition module judges whether the inputted image refers to a human, animal (for example, cat, dog, tiger, etc.), object (for example, vehicle, train, motorcycle, etc.), or a natural scene.

Meanwhile, the image recognition module 211 can extract the detailed features of the image inputted through the image input unit 100. Specifically, the image recognition module 211 extracts the detailed features whereby the state of the inputted image can be judged (for example, a laughing figure, crying figure, sleeping figure, etc.) based on the image kind judgment standard (step S116).

Then, the image recognition module 211 judges whether the inputted image has a laughing look, crying look or angry look by comparing the feature values extracted through the image state judgment standard with the feature values pre-stored in the feature value storage unit 220 (step S118).

Here, the image recognition module 211 may judge only the kind of inputted image according to the image kind judgment standard or judge the state of the inputted image according to the image state judgment standard.

In the case that the image recognition module 211 judges only the kind of the inputted image, it performs the steps S112 and S114, while in the case that it judges the state of the inputted image in addition to the kind of the image, it performs the steps S112 to S118.

Meanwhile, in the case that the image recognition unit 210 is provided with a plurality of image recognition modules, the first recognition module 211 extracts the feature of the image through the 'image kind judgment standard' and the second recognition module 212 extracts the features of the image through the 'image state judgment standard'. The second recognition module 212 extracts the detailed features of the image based on the kind of the image judged by the first recognition module 211.

For example, the first recognition module 211 recognizes the kind of the image (for example, a human) by extracting the features of the whole shape, eyes, nose and mouth of the image, and the second recognition module 212 recognizes the state of the image (for example, a laughing figure) by extracting the features based on the shapes of the eyes, nose and mouth extracted by the first recognition module 211.

FIG. 4 is a flowchart illustrating in detail a process of providing sound effects in the method for providing sound effects according to an image according to an exemplary embodiment of the present invention.

In this embodiment, the control unit 400 judges whether a plurality of objects exist in the image (step S141), and if so, the control unit 400 determines whether to provide the sound effects for one object among the plurality of objects or to provide the sound effects for the plurality of objects (step S142).

Then, the control unit determines whether to provide the basic sound according to the kind of image or to provide the sound effects according to the state of the image with respect to the corresponding objects (step S143).

Here, the basic sound according to the kind of image may be understood as the representative sound effects according to the kind of image, for example, a human's laughter, cat's meow, etc., and the sound effects according to the state of the image may be understood as detailed sound effects according to the kind and state of the image, for example, a baby's cry, grandfather's laughter, sound produced when cats are fighting, etc.

If the control unit 400 determines to provide the basic sound according to the kind of image with respect to the corresponding object, it requests the sound effect storage unit 230 to search for the sound effects corresponding to the basic sound according to the kind of image among the sound effects for the corresponding object of the inputted image (step S144).

Meanwhile, if the control unit 400 determines to provide the sound effects for the plurality of objects at step S142, the control unit 400 gives a specified order to the respective object, and requests the sound effect storage unit 230 to search for the sound effects corresponding to the plurality of objects (step S146). Here, the basic sound according to the kind of image and the sound effects according to the state of the image can selectively be provided with respect to the plurality of objects.

If the control unit 400 determines to provide the sound effects according to the state of the image at step S143, it requests the sound effect storage unit 230 to search for the sound effects according to the state of the image (step S147).

Meanwhile, if only one object exists in the image at step S141 (step S145), the control unit 400 determines whether to provide the basic sound according to the kind of image or to provide the sound effects according to the state of the image with respect to the corresponding object (step S143) and requests the sound effect storage unit 230 to selectively provide the basic sound according to the kind of the image or the sound effects according to the state of the image in accordance with the decision (steps S144 and S147).

Now, the method for providing the sound effects according to the inputted image according to the preferred embodiment of the present invention will be explained.

As an example, if an image in which a woman is laughing is inputted, the image recognition unit 210 recognizes and transfers this image to the control unit 400 and the control unit 400 requests a woman's laughter to the sound effect storage unit 230.

Then, the sound effect storage unit 230 searches for the corresponding sound effects according to the request of the control unit 400. Then, the control unit 400 outputs the image simultaneously with the corresponding sound effects searched by the sound effect storage unit.

As another example, if an image in which a tiger is roaring is inputted, the image recognition unit 210 recognizes and transfers this image to the control unit 400 and the control unit 400 requests a tiger's roar to the sound effect storage unit 230.

Then, the sound effect storage unit 230 searches for the corresponding sound effects according to the request of the control unit 400. Then, the control unit 400 outputs the image simultaneously with the corresponding sound effects searched by the sound effect storage unit.

As still another example, if an image in which a vehicle is moving is inputted, the image recognition unit 210 recognizes and transfers this image to the control unit 400, and the control unit 400 requests a sound produced when a vehicle is moving to the sound effect storage unit 230.

Then, the sound effect storage unit 230 searches for the corresponding sound effects according to the request of the control unit 400. Then, the control unit 400 outputs the image simultaneously with the corresponding sound effects searched by the sound effect storage unit.

As still another example, if an image of a man is inputted from the electronic album, the image recognition unit 210 recognizes and transfers this image to the control unit 400, and the control unit 400 requests a man's voice to the sound effect storage unit 230.

Then, the sound effect storage unit 230 searches for the corresponding sound effects according to the request of the control unit 400. Then, the control unit 400 outputs the image simultaneously with the corresponding sound effects searched by the sound effect storage unit.

Accordingly, the user can hear the sound effects suitable for the image being displayed through the electronic book, resulting in that the contents of the image can be conveyed to the user more lively and efficiently.

As still another example, if an image in which a cat is meowing is inputted, the image recognition unit 210 recognizes and transfers this image to the control unit 400 and the control unit 400 requests a cat's meow to the sound effect storage unit 230.

Then, the sound effect storage unit 230 searches for the corresponding sound effects according to the request of the control unit 400. Then, the control unit 400 outputs the image simultaneously with the corresponding sound effects searched by the sound effect storage unit.

At this time, the cat's meow outputted through the setting of the user or the control unit 400 may be a general meow of a cat corresponding to the basic sound of the cat or the sound effects according to the state of the cat, for example, meow produced when the cat is angry and when the cat is fighting, pet meows produced when the cat is with its owner, etc. Here, the sound effects according to the state of the cat may be provided in sequence, or only one sound effect may be provided.

As described above, the apparatus and method for providing sound effects according to an image according to exemplary embodiments of the present invention has at least one of the following effects.

First, the apparatus/method can convey the contents of the image to a user lively and effectively by recognizing the type of the inputted image and providing proper sound effects.

Second, unlike the existing program for education for providing a stored image and corresponding sound effects, the apparatus/method can recognize the image provided from an electronic book, electronic album, web, etc., search and output proper sound effects according to a recognition result.

Third, the apparatus/method can provide an image and corresponding sound effects simultaneously, and thus the meaning and the state of the image can be lively conveyed to the user.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for providing sound effects according to an image, comprising:
   an image input unit for receiving an input of an image;
   a sound effect providing unit for recognizing a kind and a state of an object within the image inputted through the image input unit and searching sound effects, stored in a sound effect storage unit, according to the recognized kind and state of the object within the inputted image to provide suitable sound effects for the inputted image; and
   an image output unit for outputting the image inputted through the image input unit and the sound effects provided from the sound effect providing unit,
   wherein the sound effect providing unit recognizes the kind of the object within the inputted image according to a first standard of judgment, and recognizes the state of the recognized object within the inputted image according to a second standard of judgment,
wherein the state of the object represents an expression which is made by the object that represents the recognized kind, and
wherein when no suitable sound effects exist for the inputted image, only the inputted image is output by the image output unit.

2. The apparatus as claimed in claim 1, wherein the sound effect providing unit comprises:
an image recognition unit for extracting features of the image inputted through the image input unit and recognizing the object within the inputted image by classifying the inputted image through the extracted features;
the sound effect storage unit for storing sound effects addressable according to the image recognized by the image recognition unit; and
a feature value storage unit for storing feature values from a plurality of images.

3. The apparatus as claimed in claim 2, wherein the image recognition unit comprises at least one recognition module for recognizing the object within the inputted image by extracting the features of the inputted image and classifying the inputted image based on the extracted features.

4. The apparatus as claimed in claim 3, wherein the recognition module recognizes the inputted image through the first standard of judgment and the second standard of judgment.

5. The apparatus as claimed in claim 2, wherein the sound effect providing unit judges whether the inputted image recognized through the image recognition unit includes a plurality of objects and provides the sound effects according to a result of judgment.

6. The apparatus as claimed in claim 2, wherein the sound effects stored in the sound effect storage unit include a basic sound provided according to the first standard of judgment and sound effects by states which are classified and provided according to the second standard of judgment.

7. A method for providing sound effects according to an image, comprising:
recognizing a kind and a state of an object within an inputted image;
searching sound effects stored previously according to the recognized kind and state of the object within the inputted image to provide suitable sound effects for the inputted image; and
outputting the inputted image and the provided sound effects,
wherein the recognizing of the kind and the state of the object within the inputted image comprises:
recognizing the kind of the object within the inputted image according to a first standard judgment; and
recognizing the state of the recognized object within the inputted image according to a second standard of judgment, and
wherein the state of the object represents an expression which is made by the object that represents the recognized kind, and
wherein when no suitable sound effects exist for the inputted image, only the inputted image is output.

8. The method as claimed in claim 7, wherein recognizing the inputted image comprises:
extracting features of the inputted image according to the first standard of judgment; and
recognizing the object within the inputted image by comparing the extracted feature values with pre-stored feature values.

9. The method as claimed in claim 8, wherein recognizing the inputted image further comprises:
extracting features of the inputted image according to the second standard of judgment; and
recognizing the object within the inputted image by comparing the extracted feature values with the pre-stored feature values.

10. The method as claimed in claim 7, wherein the pre-stored feature values are extracted from a plurality of images.

11. The method as claimed in claim 7, wherein the sound effects include a basic sound provided according to the first standard of judgment and sound effects by states which are classified and provided according to the second standard of judgment.

12. The method as claimed in claim 7, wherein the searching the sound effects according to the recognized image comprises:
judging whether the recognized image includes a plurality of objects; and
providing the sound effects stored previously according to a result of said judgment.

13. The method as claimed in claim 12, wherein providing the sound effects according to the result of the judgment comprises providing one of (1) the basic sound provided according to the first standard of judgment and (2) the sound effect for each state according to the second standard of judgment if it is judged that the recognized image includes one object.

14. The method as claimed in claim 12, wherein providing the sound effects according to the result of the judgment further comprises providing sound effects corresponding to at least one object among the plurality of objects if it is judged that the recognized image includes the plurality of objects.

15. The method as claimed in claim 14, wherein the sound effects stored in the sound effect storage unit include a basic sound provided according to the first standard of judgment and sound effects by states which are classified and provided according to the second standard of judgment.

* * * * *